(12) United States Patent
Goodwin, III

(10) Patent No.: US 8,370,220 B1
(45) Date of Patent: Feb. 5, 2013

(54) METHOD OF COMPLETING A TRANSACTION USING WIRELESSLY TRANSFERRED PAYMENT INFORMATION

(75) Inventor: John C. Goodwin, III, Suwanee, GA (US)

(73) Assignee: NCR Corporation, Duluth, GA (US)

( * ) Notice: Subject to any disclaimer, the term of this patent is extended or adjusted under 35 U.S.C. 154(b) by 3121 days.

(21) Appl. No.: 10/656,785

(22) Filed: Sep. 5, 2003

(51) Int. Cl.
 *G06Q 10/00* (2012.01)
 *G06Q 30/00* (2012.01)
(52) U.S. Cl. .......................................... 705/28; 705/14
(58) Field of Classification Search ............... 705/28, 705/14
 See application file for complete search history.

(56) References Cited

U.S. PATENT DOCUMENTS

| | | | | |
|---|---|---|---|---|
| 5,544,255 | A * | 8/1996 | Smithies et al. | 382/119 |
| 6,543,684 | B1 * | 4/2003 | White et al. | 235/379 |
| 6,587,835 | B1 * | 7/2003 | Treyz et al. | 705/14.64 |
| 6,643,623 | B1 * | 11/2003 | Kolls | 705/14 |
| 6,684,269 | B2 * | 1/2004 | Wagner | 710/33 |
| 7,194,438 | B2 * | 3/2007 | Sovio et al. | 705/50 |
| 7,886,962 | B2 * | 2/2011 | Vawter | 235/379 |
| 2001/0044751 | A1 * | 11/2001 | Pugliese et al. | 705/26 |
| 2001/0047441 | A1 * | 11/2001 | Robertson | 710/65 |
| 2002/0046185 | A1 * | 4/2002 | Villart et al. | 705/64 |
| 2002/0143655 | A1 * | 10/2002 | Elston et al. | 705/26 |
| 2002/0147913 | A1 * | 10/2002 | Lun Yip | 713/184 |
| 2003/0004811 | A1 * | 1/2003 | Omori | 705/17 |
| 2003/0065805 | A1 * | 4/2003 | Barnes, Jr. | 709/231 |
| 2003/0075610 | A1 * | 4/2003 | Ong | 235/492 |
| 2003/0132292 | A1 * | 7/2003 | Gomez et al. | 235/383 |
| 2003/0167207 | A1 * | 9/2003 | Berardi et al. | 705/16 |
| 2003/0191721 | A1 * | 10/2003 | Fiammante | 705/65 |
| 2003/0236872 | A1 * | 12/2003 | Atkinson | 709/223 |
| 2004/0064373 | A1 * | 4/2004 | Shannon | 705/24 |
| 2004/0098740 | A1 * | 5/2004 | Maritzen et al. | 725/27 |
| 2004/0214597 | A1 * | 10/2004 | Suryanarayana et al. | 455/552.1 |
| 2004/0243519 | A1 * | 12/2004 | Perttila et al. | 705/75 |
| 2005/0077349 | A1 * | 4/2005 | Bonalle et al. | 235/380 |
| 2006/0178986 | A1 * | 8/2006 | Giordano et al. | 705/40 |
| 2006/0190351 | A1 * | 8/2006 | Dennis | 705/26 |
| 2006/0237528 | A1 * | 10/2006 | Bishop et al. | 235/380 |
| 2007/0052517 | A1 * | 3/2007 | Bishop et al. | 340/5.2 |
| 2007/0124211 | A1 * | 5/2007 | Smith | 705/21 |
| 2008/0029598 | A1 * | 2/2008 | Fernandes et al. | 235/449 |
| 2008/0195536 | A1 * | 8/2008 | Karns et al. | 705/39 |
| 2009/0125429 | A1 * | 5/2009 | Takayama | 705/35 |

* cited by examiner

*Primary Examiner* — Matthew Gart
*Assistant Examiner* — Ashford S Hayles
(74) *Attorney, Agent, or Firm* — Paul W. Martin; Harden E. Stevens, III

(57) ABSTRACT

A method of completing a transaction using payment information received from a personal wireless device. The method includes the steps of recording items for purchase, determining a total price of the items, displaying a prompt to provide payment for the total price, and wirelessly receiving payment information from a personal wireless device.

18 Claims, 2 Drawing Sheets

METHOD OF COMPLETING A TRANSACTION USING WIRELESSLY TRANSFERRED PAYMENT INFORMATION

CROSS-REFERENCE TO RELATED APPLICATION

The present application is related to co-pending application Ser. No. 10/656,784, entitled "METHOD OF WIRELESSLY TRANSFERRING PERSONAL INFORMATION TO A COMPUTER", filed Sep. 5, 2003, and having as inventor, John Goodwin.

BACKGROUND OF THE INVENTION

The present invention relates to transaction completion methods and wireless communication methods, and more specifically to a method of completing a transaction using wirelessly transferred payment information.

During a transaction, a personal identification number (PIN) entry device may prompt a customer to swipe a credit or debit card to provide payment information for completing the transaction. A signature capture device may prompt a customer to sign on the device to complete payment.

It would be desirable to provide a method of completing a transaction using wirelessly transferred payment information.

SUMMARY OF THE INVENTION

In accordance with the present invention, a method of completing a transaction using wirelessly transferred payment information is provided.

The method includes the steps of recording items for purchase, determining a total price of the items, displaying a prompt to provide payment for the total price, and wirelessly receiving payment information from a personal wireless device.

It is accordingly an object of the present invention to provide a method of completing a transaction using wirelessly transferred payment information.

It is another object of the present invention to provide a method of completing a transaction which prompts a customer to wirelessly transfer payment information for completing the transaction.

It is another object of the present invention to provide a method of completing a transaction which accepts payment information from a wireless device in addition to a magnetic strip reader.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

DETAILED DESCRIPTION

Figure 1:
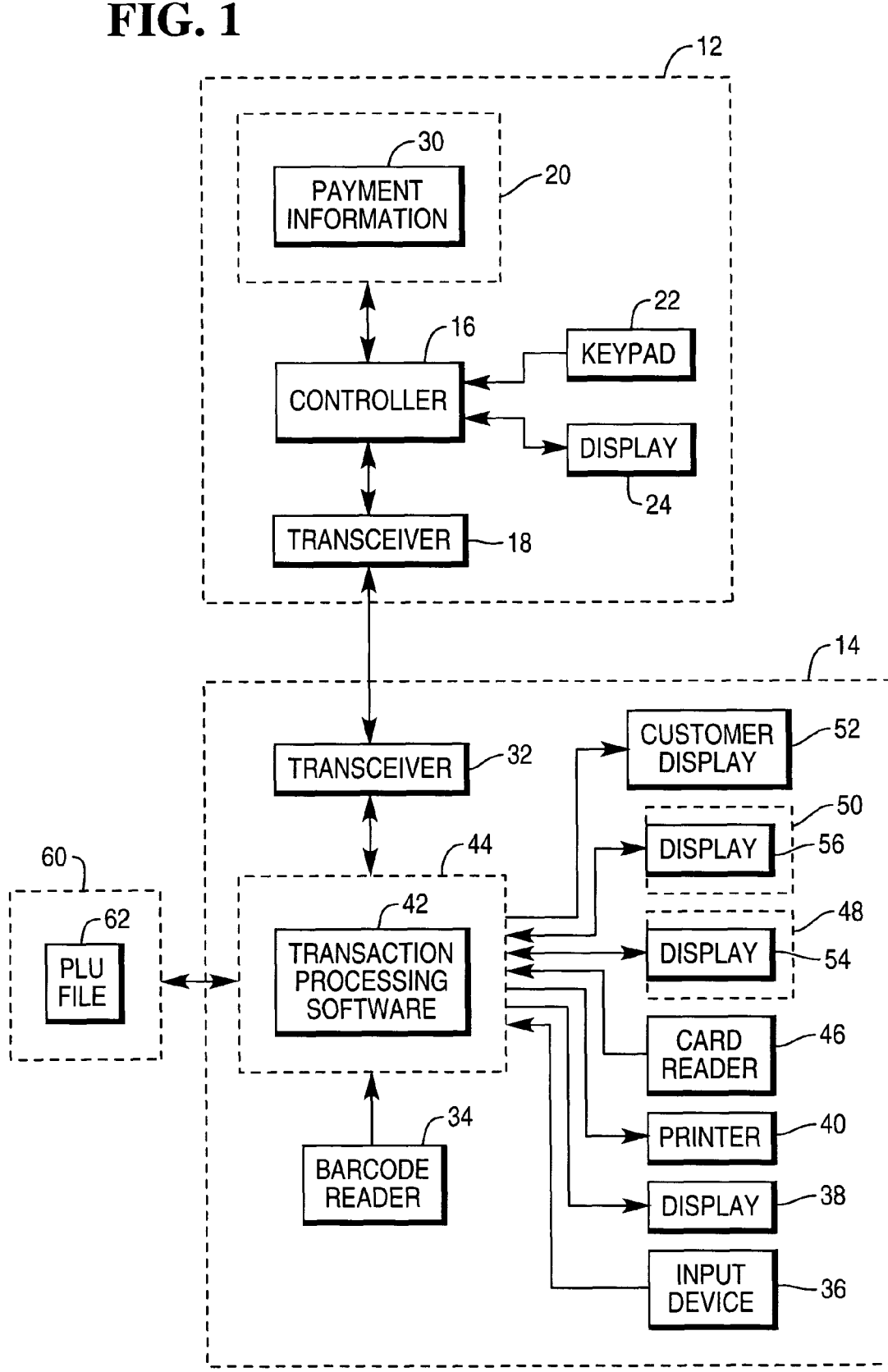
FIG. 1 is a block diagram of a transaction system.

Referring to FIG. 1, wireless device 12 communicates with computer system 14. Computer system 14 may include a kiosk, retail terminal, or other computer for completing a transaction.

Computer system 14 includes transceiver 32 for wirelessly communicating with wireless device 12. Computer system 14 receives payment information 30 from wireless device 12.

As a transaction processing computer system, computer system 14 includes processor 44 for executing transaction processing software 42. Transaction processing software 44 records items for purchase and obtains price information from a price file, such as a price look-up file (PLU) 62. PLU file 62 may be stored in transaction server 60.

Computer 14 may include additional components to function as intended. As a transaction processing computer, computer 14 may include barcode reader 34, input device 36, display 38, printer 40, card reader 46, signature capture device 48, personal identification number (PIN) pad 50, and customer display 52.

Barcode reader 34 reads barcodes on purchased items.

Input device 36 may include a keyboard or touch input device.

Display 38 may include a liquid crystal display (LCD) or cathode ray tube (CRT) display.

Printer 40 prints receipts.

Card reader 46 reads loyalty and payment cards, such as credit and debit cards. Card reader 46 may include a magnetic stripe reader or smart card reader.

Signature capture device 48 captures a customer signature. Signature capture device 48 may include a display 54 for prompting the customer to enter payment information and enter a signature.

PIN pad 50 records customer PIN numbers. PIN pad may include display 56 for prompting the customer to enter the payment information, including the type of payment card.

Customer display 52 displays information helpful to the customer, such as transaction information, and may be used to display a prompt for payment information.

Wireless device 12 may include a radio frequency identification (RFID) device, a cellular phone, personal digital assistant (PDA), or other type of wireless communication device. Wireless device 12 may communicate over RF, infrared, or other communication band. For example, wireless device 12 may be a Bluetooth-standard device. A common format, such as XML, may be used to normalize communication of personal information 30 and other data between computer system 14 and wireless device 12.

In an example embodiment, wireless device 12 includes controller 16, transceiver 18, storage medium 20, keypad 22, and display 24.

Controller 16 controls operation of wireless device 12, including transferring of payment information 30 to computer system 14.

Transceiver 18 wirelessly sends and receives information. During a transaction, transceiver 18 sends payment information 30. Transceiver 18 may also wirelessly send other data and be used for voice communication.

Keypad 22 records payment information 30 or records commands to send payment information 30 from storage medium 20 to computer system 14.

Display 24 displays communication information. Display 24 may additionally display a prompt to enter payment information sent in a wireless message from computer system 14.

Storage medium 20 stores payment information 30. Storage medium 20 may additionally store transaction details, including a digital receipt from transaction processing software 42.

Figure 2:
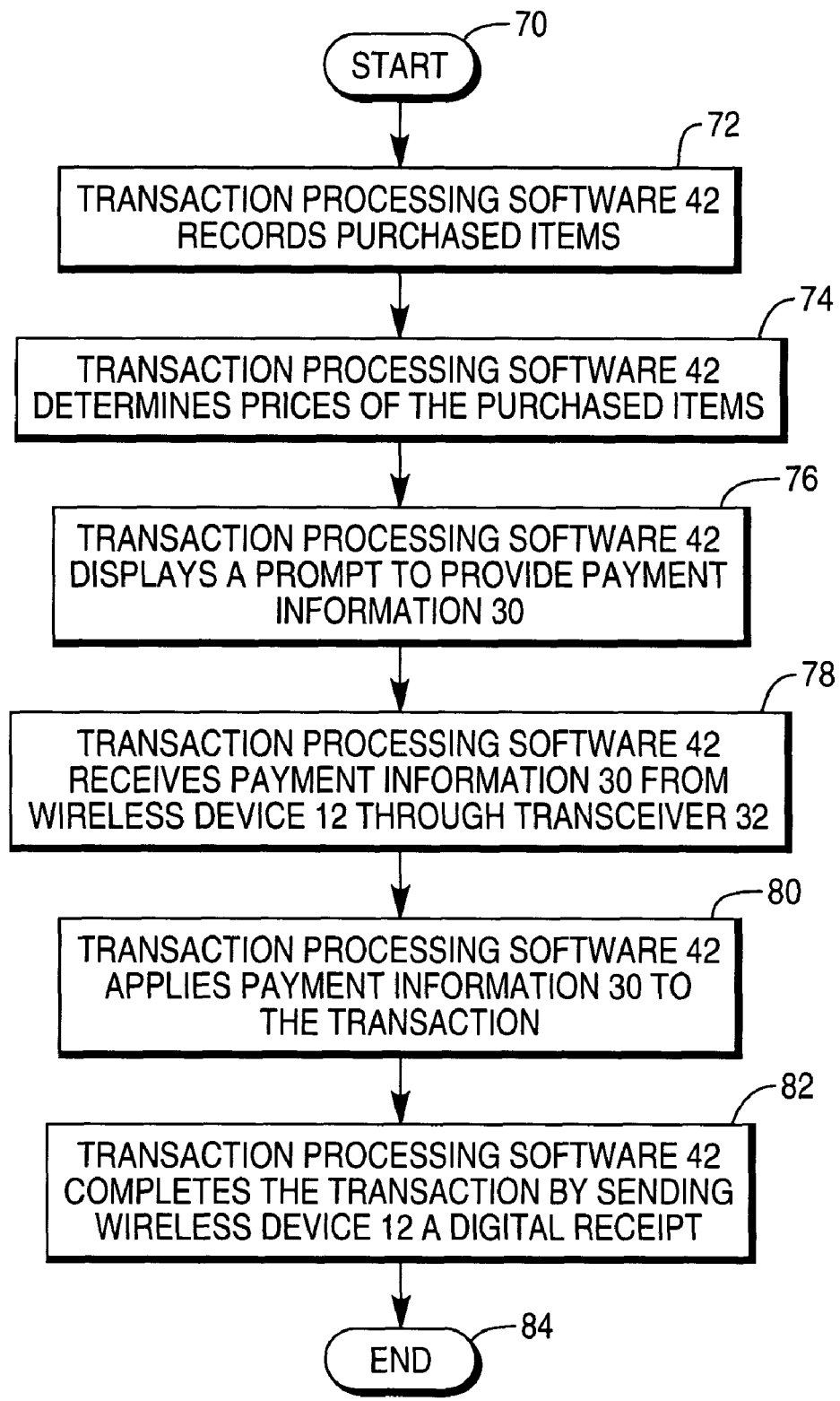
FIG. 2 is a flow diagram illustrating the transaction method.

Turning now to FIG. 2, the operation of transaction processing software 42 is illustrated in detail beginning with Start 70.

In step 72, transaction processing software 42 records purchased items. Transaction processing software 42 may obtain item information through barcode reader 34 or input device 36.

In step 74, transaction processing software 42 determines prices of the purchased items. Transaction processing software 42 preferably determines the prices from PLU file 62.

In step 76, transaction processing software 42 displays a prompt to provide payment information 30. If computer system 14 is a retail transaction terminal, transaction processing software 42 displays the prompt on display 54 of signature capture device 48, display 56 of PIN pad 50, or customer display 52. If computer system 14 is a kiosk, transaction processing software 42 displays the prompt on display 38. Transaction processing software 42 may additionally send a message to wireless device 12 containing a command to display the prompt.

In step 78, transaction processing software 42 receives payment information 30 from wireless device 12 through transceiver 32. The owner of wireless device 12 responds to any of the displayed prompts by sending payment information 30 from storage medium 20 or by entering payment information 30 in keypad 22.

In step 80, transaction processing software 42 applies payment information 30 to the transaction.

In step 82 transaction processing software 42 completes the transaction by sending wireless device 12 a digital receipt.

In step 84, operation ends.

Although the present invention has been described with particular reference to certain preferred embodiments thereof, variations and modifications of the present invention can be effected within the spirit and scope of the following claims.

What is claimed is:

1. A method of completing a purchase transaction implemented by a stationary transaction terminal that includes a customer display, personal identification number entry device, a magnetic stripe reader and a printer, the method comprising:
    a) reading a barcode on each of one or more items as each item is presented to the stationary transaction terminal for purchase wherein reading each barcode returns data that identifies each of the one or more items and wherein each barcode is read using a barcode scanner attached to the stationary transaction terminal;
    b) determining a total price of the identified one or more items;
    c) displaying a prompt to provide payment for the total price on a display attached to the stationary transaction terminal;
    d) wirelessly sending a message to a personal wireless device from the stationary transaction terminal wherein the message comprises a command to display on the personal wireless device a prompt to provide payment information for the total price;
    e) wirelessly receiving payment information transmitted from the personal wireless device directly to the stationary transaction terminal; and
    f) completing the purchase transaction using the payment information received from the personal wireless device.

2. The method of claim 1, wherein step c further comprises: displaying the prompt on a display of a signature capture device attached to the stationary transaction terminal.

3. The method of claim 1, wherein step c further comprises: displaying the prompt on a display of the personal identification number entry device attached to the stationary transaction terminal.

4. The method of claim 1, wherein step c further comprises: displaying the prompt on the customer display attached to the stationary transaction terminal.

5. The method of claim 1, wherein step c further comprises: displaying the prompt on a kiosk display attached to the stationary transaction terminal.

6. The method of claim 1, further comprising the step of:
    g) sending a digital receipt to the personal wireless device after receiving payment information from the personal wireless device.

7. A transaction system comprising:
    a personal wireless device for storing payment information of a customer; and
    a stationary transaction computer including:
    a display;
    a barcode reader;
    a transceiver; and
    where the stationary transaction computer is adapted to identify items presented to the stationary transaction computer for purchase, to read barcodes on items presented to the stationary transaction computer using the barcode reader, to identify the items using the barcodes, to record the items, to determine a total price of the items identified, to cause the display to display a prompt to the customer to provide payment for the total price, to wirelessly send a message to the personal wireless device from the transceiver of the stationary transaction computer wherein the message comprises a request for payment information for the total price and to wirelessly receive payment information transmitted from the personal wireless device to the transceiver of the stationary transaction computer.

8. The system of claim 7, wherein the display comprises part of a signature capture device.

9. The system of claim 7, wherein the display comprises part of a personal identification number entry device.

10. The system of claim 7, wherein the display comprises a customer display.

11. The system of claim 7, wherein the computer comprises a kiosk.

12. The system of claim 7, wherein the computer comprises a retail terminal.

13. The method of claim 1, wherein identifying one or more items comprises using a touch input device to receive information about at least one of the one or more items.

14. The system of claim 7, where the stationary transaction computer is further adapted to send a digital receipt to the personal wireless device after the payment information is received.

15. The method of claim 1, wherein the personal wireless device is a cellular phone.

16. The method of claim 1, wherein the personal wireless device is a personal digital assistant.

17. The system of claim 7, wherein the personal wireless device is a cellular phone.

18. The system of claim 7, wherein the personal wireless device is a personal digital assistant.

* * * * *